United States Patent [19]
Smith, Jr.

[11] Patent Number: 5,864,054
[45] Date of Patent: Jan. 26, 1999

[54] GLIDE HEAD ASSEMBLY AND TEST DEVICE UTILIZING THE SAME

[75] Inventor: Stanley C. Smith, Jr., Colorado Springs, Colo.

[73] Assignee: Microglide, Inc., Colorado Springs, Colo.

[21] Appl. No.: 780,634

[22] Filed: Jan. 8, 1997

[51] Int. Cl.⁶ .................................................. G01B 5/28
[52] U.S. Cl. ............................................................. 73/105
[58] Field of Search ...................... 73/104, 105; 310/370

[56] References Cited

U.S. PATENT DOCUMENTS

| | | | |
|---|---|---|---|
| 4,327,593 | 5/1982 | Porat | 73/514.34 |
| 4,532,802 | 8/1985 | Yeack-Scranton et al. | |
| 4,586,377 | 5/1986 | Schmid | 73/514.34 |
| 5,014,554 | 5/1991 | Terada et al. | 310/370 |
| 5,086,360 | 2/1992 | Smith et al. | |
| 5,166,847 | 11/1992 | Zak | |
| 5,373,269 | 12/1994 | Kaida et al. | 310/370 |
| 5,423,207 | 6/1995 | Flechsig et al. | |
| 5,450,747 | 9/1995 | Flechsig et al. | |
| 5,488,857 | 2/1996 | Homma et al. | |
| 5,499,153 | 3/1996 | Uemura et al. | |
| 5,640,089 | 6/1997 | Horikawa et al. | 73/105 |

OTHER PUBLICATIONS

A. Wallash, "Reproduction of Slider Vivrations During Head/Disk Interactions Using PZT Sensors", *IEEE Transactions on Magnetics*, vol. 24, No. 6, Nov. 1988, pp. 2763–2765.

C.E. Yeack–Scranton, "Novel Piezoelectric Transducers to Monitor Head–Disk Interactons", *IEEE Transactions on Magnetics*, vol. Mag.–22, No. 5, Sep. 1986, pp. 1011–1016.

*Primary Examiner*—Robert Raevis
*Attorney, Agent, or Firm*—Timothy J. Martin; Michael R. Henson

[57] ABSTRACT

A glide head assembly is adapted for use with a test system to detect a presence of asperities on a moving surface and includes an elongated flexure having a first end portion attached to a mounting structure and an opposite second end portion positioned in proximity to the moving surface when in operation. A slider is disposed on the second end portion and has a first surface facing the moving surface when in operation, a second surface opposite the first surface, and a sidewall extending therebetween. A piezoelectric transducer is attached to the sidewall and projects outwardly therefrom to terminate in a free distal end. The piezoelectric transducer is adapted to vibrate when contacted by an asperity, thereby to produce an electronic signal at a selected signal frequency, and is preferably formed to include a pair of spaced apart legs.

24 Claims, 4 Drawing Sheets

GLIDE HEAD ASSEMBLY AND TEST DEVICE UTILIZING THE SAME

FIELD OF INVENTION

The present invention is broadly directed to a glide head assembly adapted for use with a system for testing moving surfaces to detect a presence of asperities thereon. More particularly, the present invention is directed to a glide head assembly that is adapted to detect asperities which project a specified height above moving surfaces. Even more specifically, the present invention concerns a glide head assembly that is adapted to generate an electronic signal in response to the presence of an asperity located on a surface of a rigid memory disk.

BACKGROUND OF THE INVENTION

In recent years, perhaps the most revolutionary development in the history of technology has been the computer. While the fundamental components of a computer's architecture remain the same, the capabilities of these individual components have increased exponentially as technology rapidly progresses. Common to almost every computer is a processing unit which receives input information and processes this information to generate an output. A computer program instructs the processing unit to perform various tasks, and an associated memory unit is incorporated to store instructions for the processing unit and to hold temporary results that occur during operation. The potential applications for computers are virtually limitless and ongoing efforts are made to design computers which are capable of carrying out these repetitious and complex operations at faster speeds.

Computer memories are used to store or "remember" a system of on-off codes for access at a later time, and systems accomplish this in a variety of ways, such as through the utilization of magnetic disks, microchips or optical devices. Where magnetic disks are concerned, patterns of magnetism are formed on the disks in order to store desired information. A magnetic disk may be in the form of either a floppy disk which is used to store and retrieve programs and data, or an arrangement of hard disks which are permanently enclosed in a hard disk drive to prevent contamination. Hard disks have a much greater memory capacity than floppy disks. Memory capacity, of course, is measured in kilobytes, megabytes or even gigabytes, with a single byte equal to eight bits of a binary code.

The hard disk drive for rigid, magnetic memory disks is akin to a conventional record turntable in that a mechanism rotates the disk with a selected angular velocity and translates a magnetic read-write head across the disk surface to permit a selected annular track to be accessed. The magnetic disks are typically journaled for rotation about a spindle in a spaced relationship to one another. A tracking arm is associated with each disk and the read-write head is mounted to this tracking arm for accessing the desired information. Conventional magnetic heads are typically referred to as "flying" data heads because they currently are constructed not to contact the surface of the disk during rotation. Rather, these heads hover above the surface on an air bearing that is located between the disk and the head and which is caused, at least in part, by rotation of the disk at high speeds.

A persisting problem with rigid magnetic memory disks in that asperities, i.e., protrusions on the surfaces of the disks, may cause an anomaly when encountered by the read-write head during high speed revolutions. These asperities can cause errors in the transfer of information or even damage to the read/write head. In an effort to reduce the occurrences of asperities, manufacturers commonly burnish the surfaces of disks. In the burnishing process a burnishing head; rather than a magnetic read-write head, is mounted in a similar manner relative to the disk as discussed above. During the burnishing process, the burnishing head operates to smooth out these surface protrusions.

The next step in further refining magnetic disks for production is through the use of a glide head. The purpose of a glide head is to detect, via proximity or contact, any asperities remaining after the burnishing operation which may come into contact with the data head during use. Glide heads are required to hover and detect asperities which are located above specified data head flying heights. Glide heads thus dynamically test the integrity of a disk's surfaces.

The magnetic media industry, in particular, is requiring that magnetic disks have increasing recording densities. Accordingly, for manufacturers to develop production quality rigid memory disks for use in this industry and the computer industry in general, it is necessary to utilize glide heads having more sensitive response characteristics. Existing glide heads have inherent problems because it is difficult to precisely control the electrical response characteristics of these devices.

The electrical response of a glide head is dependent upon detection parameters such as amplitude, frequency, and signal to noise ratio (S/N). However, because the industry's demands for higher magnetic densities require a lowering of the data heads' flying height over the surface of the magnetic disks, it becomes more difficult to tighten the physical tolerances of glide heads and effectively control these parameters.

In the past it has been known to employ a glide head assembly whose slider component is configured to include a lateral wing portion that has a layer of piezoelectric material adhered on an upper surface thereof. This piezoelectric material is approximately 20–30 mls (0.020–0.030 inches) thick. As the slider contacts a surface asperity, the crystalline lattice of the piezoelectric material is disturbed. This disturbance causes an electronic signal to be sent, via electrical lead wires, to a signal processing unit. Unfortunately, the same disturbances also causes a variety of other electronic signals to be sent to the processing unit. These other signals are caused by resonant vibrations of other components in the glide head assembly, as well as inherent noise in the system. The frequencies of these mixed electronic signals are unpredictable and, therefore, it is difficult to adequately filter that electronic signal which is specifically associated with the encountered asperity. It is, therefore, difficult with these prior devices to reliably detect the presence of asperities on the surfaces of rigid memory disk.

Accordingly, there remains a need to provide a new and useful glide head assembly which has more reliable electrical response characteristics during the asperity detection process. The present invention is directed to meeting this need.

SUMMARY OF INVENTION

It is an object of the present invention to provide a new and useful glide head assembly that is adapted for use with a test system for detecting a presence of asperities on a moving surface.

Another object of the present invention is to provide a new and useful test device for testing the surface of a rotating disk to determine a presence of asperities thereon.

A further object of the present invention is to provide a new and useful glide head assembly which exhibits improved electrical response characteristics during the asperity detection process.

Yet another object of the present invention is to provide a new and useful glide head assembly which responds in the presence of an asperity to vibrate with a dominant mode of vibration, thereby to produce a dominant signal at a selected dominant frequency.

Still a further object of the present invention is to provide a glide head structure adapted to mount to a flexure for use with a test system for detecting a presence of asperities on a moving surface.

In furtherance with these objectives, the present invention is directed to a glide head assembly that is associated with a mounting structure and adapted for use with a test system for detecting a presence of asperities on a moving surface, preferably that of a rigid memory disk. The test system includes a signal processor operative to process an electronic signal that is generated in response to the presence of the asperity.

Broadly, the glide head assembly of the present invention comprises an elongated flexure having a longitudinal axis and including a first end portion attachable to the mounting structure and a second end portion opposite the first end portion. This second end portion is adapted to be positioned in proximity to the moving surface when in an operative state. A slider is disposed on the second end portion and this slider has a first surface facing the moving surface when in the operative state and a second surface opposite the first surface. A sidewall surface extends between the slider's first and second surface. A piezoelectric transducer is supported on the sidewall surface and projects outwardly therefrom. This transducer is responsive in the operative state to the presence of an asperity relative to the slider as the asperity moves past the slider to vibrate, thereby to produce the electronic signal at a selected signal frequency.

The slider is secured to the flexure's second end portion by a first layer of first adhesive and the piezoelectric transducer is secured to the sidewall surface by a second layer of second adhesive. This second adhesive may be either ester-based or ether-based. Electrical contacts are located on opposite surfaces of the piezoelectric transducer, and a sleeve is disposed longitudinally along the flexure for receiving and supporting the electrical leads and communicating the electrical signal back to the signal processor.

The piezoelectric transducer has a reduced thickness relative to that of the slider, with this thickness being within a range of 5 mls (0.005 inches) to 30 mls (0.030 inches). Preferably, this thickness is approximately 25 mls (0.025 inches). The piezoelectric transducer is elongated along a central transducer axis. A proximal end of the transducer is mounted to the sidewall surface and projects outwardly therefrom to terminate in at least one free distal end. The transducer axis may be either perpendicular to the flexure's longitudinal axis or in a common plane as the longitudinal axis.

It is preferred that the piezoelectric transducer be a legged structure having a generally V-shaped design. To this end, the transducer includes a pair of legs which may diverge longitudinally from the proximal end to terminate, respectively, at first and second free distal ends. These legs are each skewed relative to the transducer axis and are preferably symmetrical about that axis. The legs are adjoined at a juncture of the piezoelectric transducer which defines the proximal end.

The present invention also relates to a test device for testing opposed moving surfaces of a rotating memory disk to determine a presence of asperities thereon. This test device comprises a mounting structure, a rotary drive operative to rotate the memory disk relative to the mounting structure, at least a first glide head assembly supported on the mounting structure, signal processing electronics and electrical interconnects. The first glide head assembly is preferably constructed as discussed above so that it includes a flexure, a slider and a piezoelectric transducer that is responsive in an operative state to the presence of an asperity to produce an electronic signal at a selected signal frequency. As such, the electrical interconnects are employed to establish electrical communication between the piezoelectric transducer and the signal processor which operates to process this electronic signal.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention broadly relates to a glide head assembly that is adapted to detect a presence of asperities on moving surfaces. During the production of rigid memory disks, it is common that asperities, or protrusions, remain on the surfaces of these disks after the burnishing operation is completed. Because each of these asperities may cause an error in the information transferred or damage to the read-write data head during use, it is necessary to detect the presence of residual asperities to determine if the rigid memory disks meet certain performance criteria. As the density of the information stored on memory disks increases, it becomes necessary to lower the flying height of data heads over the surfaces of the disks. To avoid damage to the data head during use, then, requires glide heads to detect smaller and smaller asperities which protrude above specified data head flying heights. The present invention is particularly adapted to reliably detecting these smaller asperities.

Figure 1:
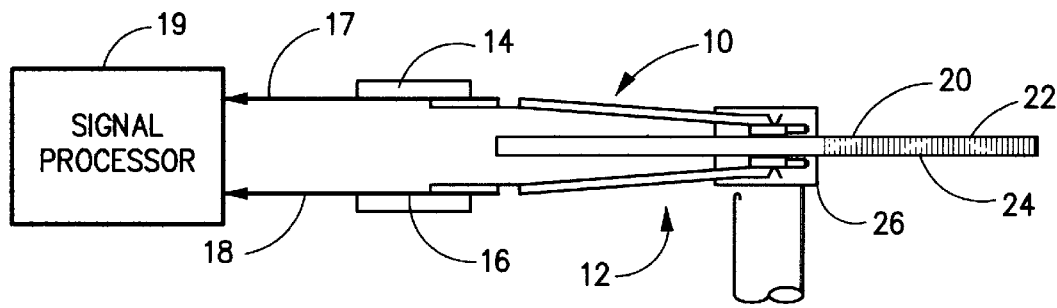
FIG. 1 is a diagrammatic side view of a pair of glide head assemblies according to the first exemplary embodiment of the present invention and showing the glide head assemblies in use to detect the presence of asperities on opposite moving surfaces of a magnetic disk.

As generally introduced in FIG. 1, a pair of glide head assemblies 10 and 12 are shown in use detecting the presence of asperities on opposite surfaces of a rigid magnetic memory disk 20 that is journaled for rotation about a spindle 26. While FIG. 1 only depicts the detection apparatus associated with a single rigid memory disk 20, it should be appreciated that a plurality of rigid memory disks could be rotatably journaled about spindle 26, with each of these memory disks having an associated pair of glide head assemblies.

As shown in FIG. 1, each of glide head assemblies 10 and 12 has an associated mounting structure and is adapted for use with a system for testing one of the moving surfaces of rigid memory disk 20. Specifically, upper glide head assembly 10 is employed to detect the presence of asperities on an upper surface 22 of rigid memory disk 20. Upper glide head assembly 10 is secured to a mounting structure 14 and communicates detection results, via electrical leads 17, to a system that includes signal processor 19. Signal processor 19, a standard monitoring circuitry as is known in the art, includes filtering circuitry capable of selecting a desired bandwidth for monitoring. Similarly, lower glide head assembly 12 is employed to detect the presence of asperities on a lower surface 24 of rigid memory disk 20. Lower glide head assembly 12 is secured to a lower mounting structure 16 and communicates detection results, via electrical leads 18, to signal processor 19.

Figure 2:
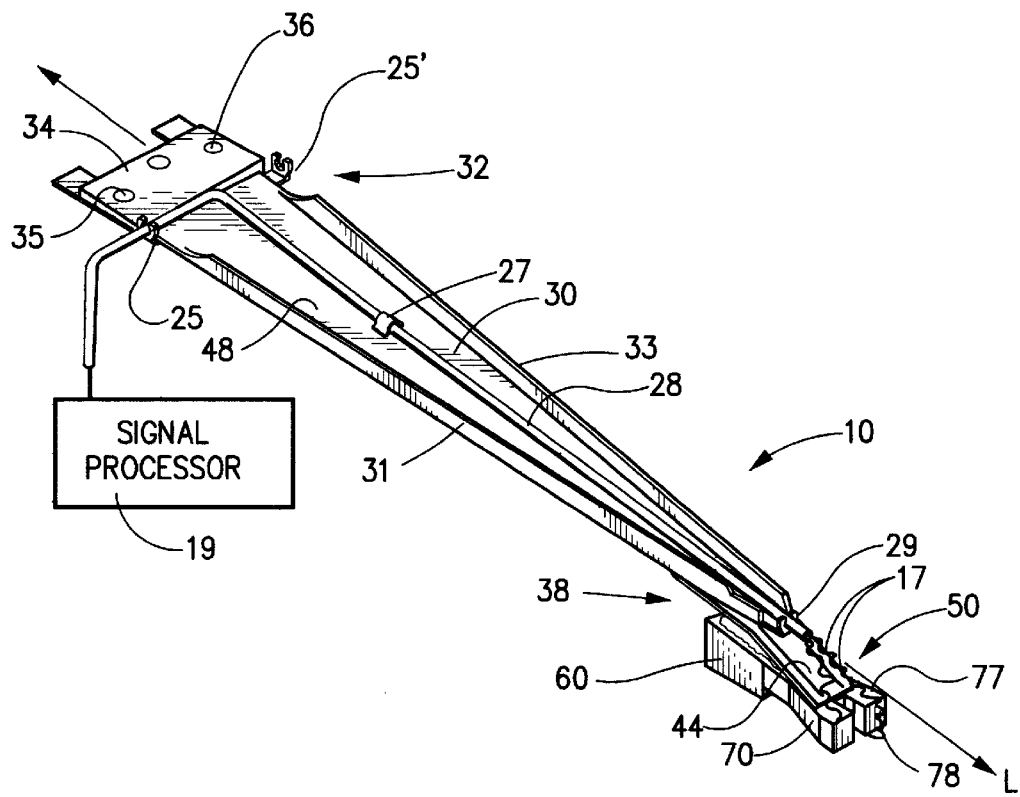
FIG. 2 is a perspective view of the construction for either of the glide head assemblies represented in FIG. 1.

The preferred construction of the glide head assembly according to a first exemplary embodiment of the present invention is best introduced with reference to FIG. 2. Here, it may be seen that the representative upper glide head assembly 10 comprises an elongated flexure 30 and a glide head structure 50. Flexure 30 includes a first end portion 32 which is adapted to be secured to the mounting structure 14 in FIG. 1 by a mounting bracket 34 that is provided with a pair of spaced apart securement holes 35 and 36. A second end portion 38 of flexure 30, which is opposite first end portion 32, is adapted to be positioned in proximity to the upper moving surface 22 of rigid memory disk 20 when in an operative state as shown in FIG. 1.

Flexure 30 extends along a longitudinal axis "L" and includes a pair of spaced apart, upstanding sidewalls 31, 33 which are symmetrical about longitudinal axis "L" and converge from first end 32 toward second end 38. Flexure 30 also includes a tongue 44 which is mounted to the flexure 30 and forms the second end portion 38. As better illustrated in FIG. 3, tongue 44 may be registered with flexure 30 by a tooling hole 52 and thereafter secured to flexure 30 by laser welding to facilitate the manufacturer of flexure 30. With this in mind, flexure 30 is preferably a Type 2 flexure known in the art. Design size is a major constraint of Type 2 flexures because these devices are limited to a z-height head thickness of approximately 34 mls (0.034 inches), with the z-height being measured as that distance between the lower surface of the flexure and the base of its associated slider. The ordinarily skilled artisan, though, would appreciate that other types of flexures could also be used for the present invention.

Figure 3:
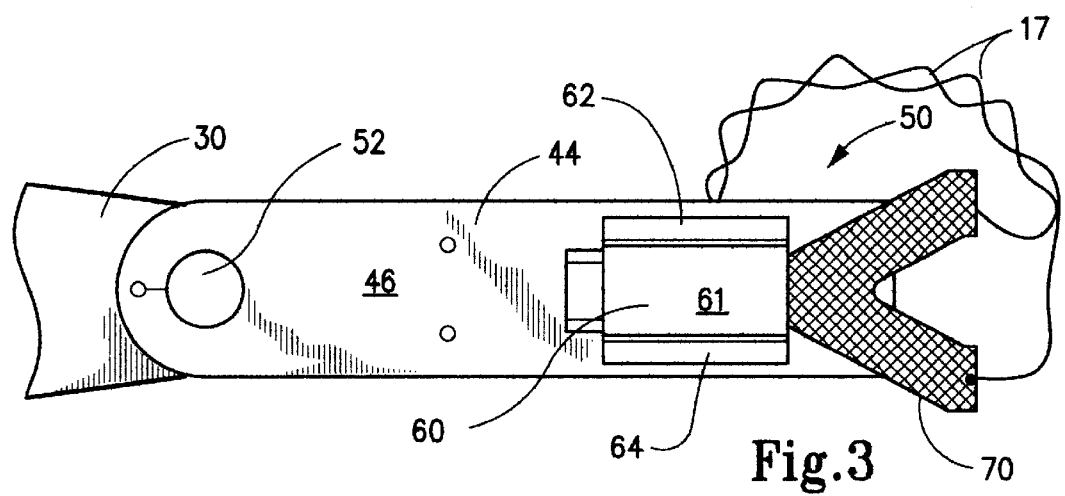
FIG. 3 is an enlarged bottom plan view of the second end portion of the glide head assembly shown in FIG. 2.
Figure 4:
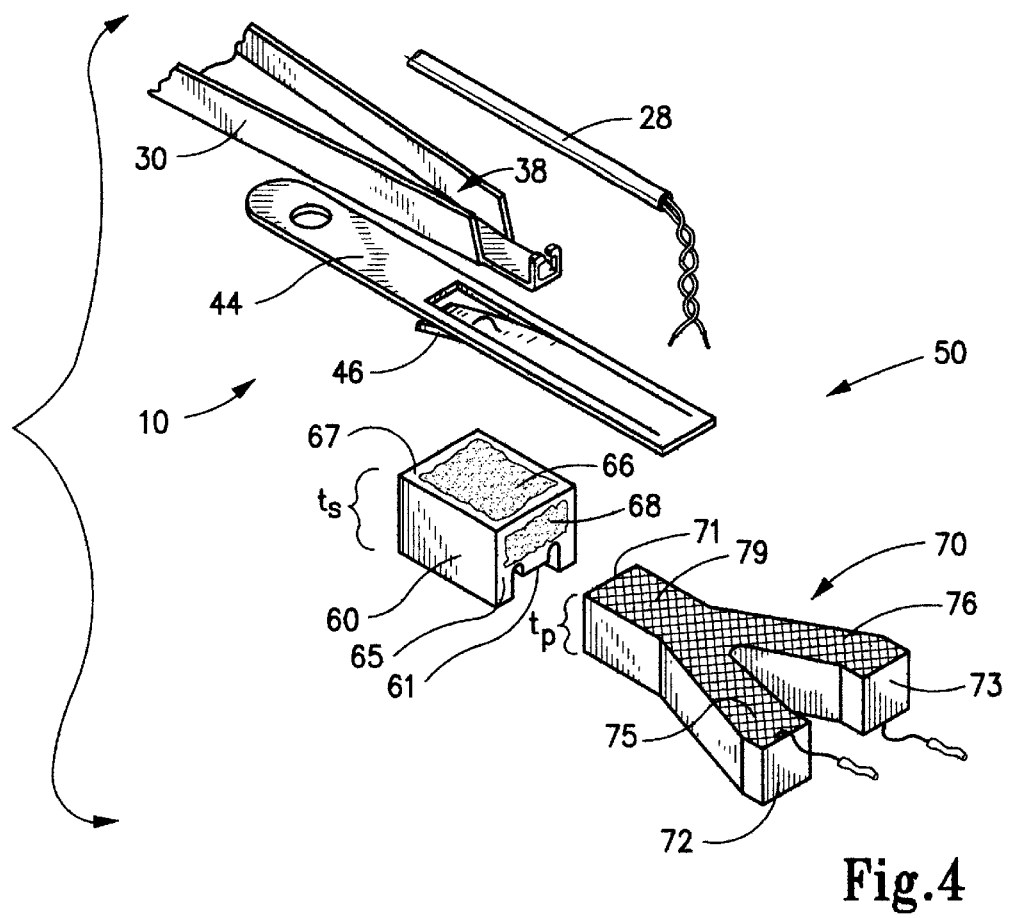
FIG. 4 is an exploded view in perspective of a preferred construction showing the second end portion of the glide head assembly according to the first exemplary embodiment of the present invention.

As shown in FIGS. 2–4, the glide head structure 50 of upper glide head assembly 10 broadly includes a slider 60 that projects downwardly from tongue 44 and a piezoelectric transducer 70 which is secured to a sidewall surface of slider 60 and projects outwardly therefrom. As will be discussed more thoroughly below, piezoelectric transducer 70 is responsive in an operative state to the presence of an asperity relative to slider 60 as the asperity moves past slider 60 to vibrate, thereby to produce an electronic signal at a selected signal frequency. Slider 60 has a first surface 61 which faces the disk's moving surface 22 when in the operative state. First surface 61 may include a pair of rails 62 and 64 that project approximately 0.005 inches away from first surface 61 to define an air bearing surface. Thus, first surface 61 is recessed relative to rails 62,64 so as to have negligible influence on the air bearing. Rails 62 and 64 are designed to fly in close proximity to asperities as they are encountered by glide head assembly 10. Slider 60 also has a second surface 67 which is opposite first surface 61 and a sidewall surface 65 extends between the first and second surfaces, 61 and 67.

Electrical leads 17 are respectively connected to opposite upper and lower surfaces 77 and 78 of piezoelectric transducer 70. Layers of gold conducting material may be provided for these connections. The electrical leads 17 operate to communicate electrical signals to signal processor 19. A sleeve 28 is disposed longitudinally along an upper surface 48 of flexure 30 and this sleeve 28 receives and supports electrical leads 17. A pair of mounting U-brackets 25 and 29 are, respectively, affixed to first end portion 32 and the second end portion 38 of flexure 30 for this purpose. In addition, a retainer 27 is provided on the upper surface 48 to help receivably retain sleeve 28 so that the integrity of electrical signals produced by upper glide head assembly 10 is not jeopardized by any unnecessary movement during use. It should be readily appreciated that the construction of the lower glide head assembly 12 of FIG. 1 would be identical to that described herein with reference to upper glide head assembly 10, with the exception that the electrical leads 18 associated glide head assembly 12 could be supported by U-bracket 25' positioned at the first end portion 32 of flexure 30.

A preferred construction for the individual components which comprise upper glide head assembly 10 according to the first exemplary embodiment of the present invention may best be appreciated now with reference to the exploded view of FIG. 4. Slider 60 is secured to second end portion 38 of flexure 30, and specifically the lower surface 46 of tongue 44, by a first layer 66 of first adhesive. It is preferred that this first adhesive layer 66 have a bond that does not distort the slider 60 and which can withstand physical and thermal shock. If possible, the first adhesive layer 66 should retain these properties over a period of approximately one year, which is a relatively long life for a glide head assembly. The adhesive of choice which exhibits these desirable characteristics is a Loctite® 466 UV adhesive, a trademark of the Loctite Corporation.

A second layer 68 of second adhesive material is also incorporated into upper glide head assembly 10 and operates to secure a proximal end 71 of piezoelectric transducer 70 to sidewall surface 65 of slider 60. This second adhesive layer 68 should also have certain bonding characteristics. It has been found that the more rigid this bond, the more sensitive slider 60 is when asperities are encountered. Preferably, the bond of second adhesive layer 68 should also be able to withstand thermal and physical shock and last approximately one year. Ether-based or ester-based adhesives are well suited for such an application, with either 496 cyanoacrylate or 406 cyanoacrylate being the adhesive of choice.

Piezoelectric transducer 70 has a reduced thickness relative to that of slider 60. With 34 mls (0.034 inches) being the maximum z-height allowed by Type 2 flexures, it is preferred to use a 50% slider having a thickness "$t_s$" of 0.034 inches and a piezoelectric transducer 70 having a thickness "$t_p$" of 0.025 inches. Of course, it should be appreciated that this thickness "$t_p$" could vary within a range of approximately 0.005 inches to 0.030 inches, depending upon the application at hand.

Figure 5:
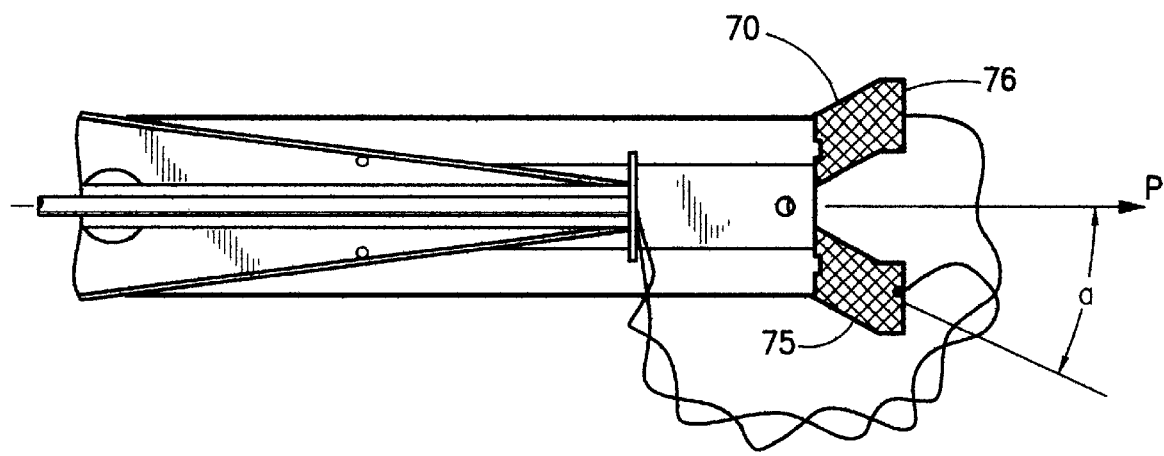
FIG. 5 is an enlarged top plan view of the second end portion of the glide head assembly shown in FIGS. 2–4.
Figure 7:
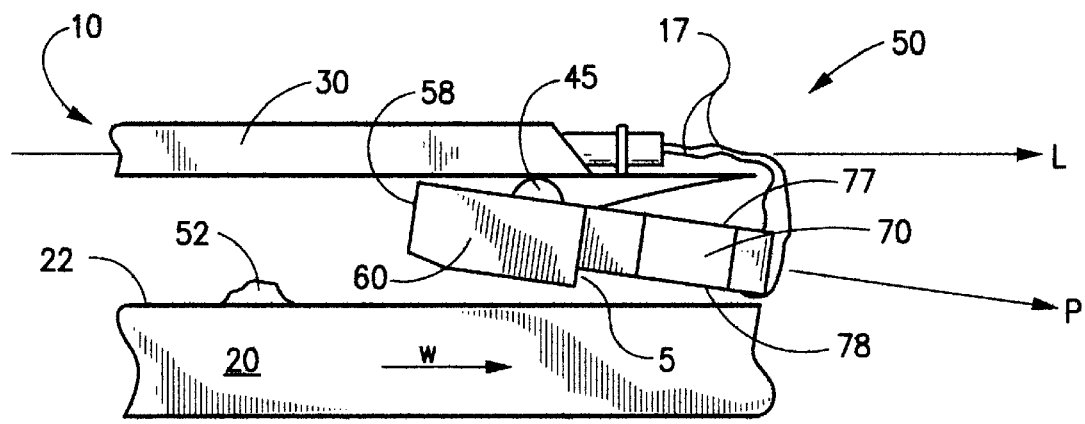
FIG. 7 is a partial side view in elevation of the glide head assembly in FIG. 6 and showing the glide head approaching an asperity on the surface of the rotating magnetic disk.

In this first exemplary embodiment of glide head assembly 10 of the present invention, piezoelectric transducer 70 is shown adhered directly to a face of sidewall surface 65 that extends transversely to the longitudinal axis "L" so that piezoelectric transducer 70 extends in a forward direction. Transducer 70 includes a pair of legs 75 and 76 which diverge longitudinally from a juncture 74 to terminate, respectively, at first and second distal ends 72, 73. As shown in FIGS. 5 and 7, piezoelectric transducer 70 is elongated along a central transducer axis "P", and in this first exemplary embodiment, transducer axis "P" is in a common plane at a small acute angle to longitudinal axis "L". Legs 75 and 76 are preferably symmetrical about transducer axis "P" (and thus longitudinal axis "L") with each of these legs diverging at an angle "a" of approximately 28° relative thereto. Specifically, angle "a" is chosen so that the legs of piezoelectric transducer 70 are perpendicular to the bending axis of the first mode of vibration of slider 60 when excitation occurs at the trailing edge of either of the rails 62, 64 shown in FIG. 3. In operation, of course, slider 60 vibrates in several different modes, with the maximum energy being in the first mode.

With the foregoing detailed description in mind concerning the exemplary construction of the representative upper glide head assembly 10 according to the first exemplary embodiment of the present invention, the performance of upper glide head assembly 10 may be better understood. As stated herein, both glide head assemblies 10 and 12 of the present invention are adapted for use with a system for testing moving surfaces of a rigid memory disk 20 in order to detect the presence of asperities thereon. The system includes a signal processor operative to process an electronic signal that is generated in response to the presence of an asperity. The operation of representative upper glide head assembly 10 is best explained with reference to FIGS. 6 and 7. Here, upper glide head assembly 10 is employed to detect, via proximity or contact, any remaining asperities which may come into contact with a read-write data head during normal use. Upper glide head assembly 10, thus, dynamically tests the integrity of upper surface 22 of memory disk 20 by hovering on an air foil below specified data head flying heights. These flying heights may be in a range of approximately $0.1\mu$ inches to $2\mu$ inches above upper surface 22 depending upon disk manufacturer requirements.

Figure 6:
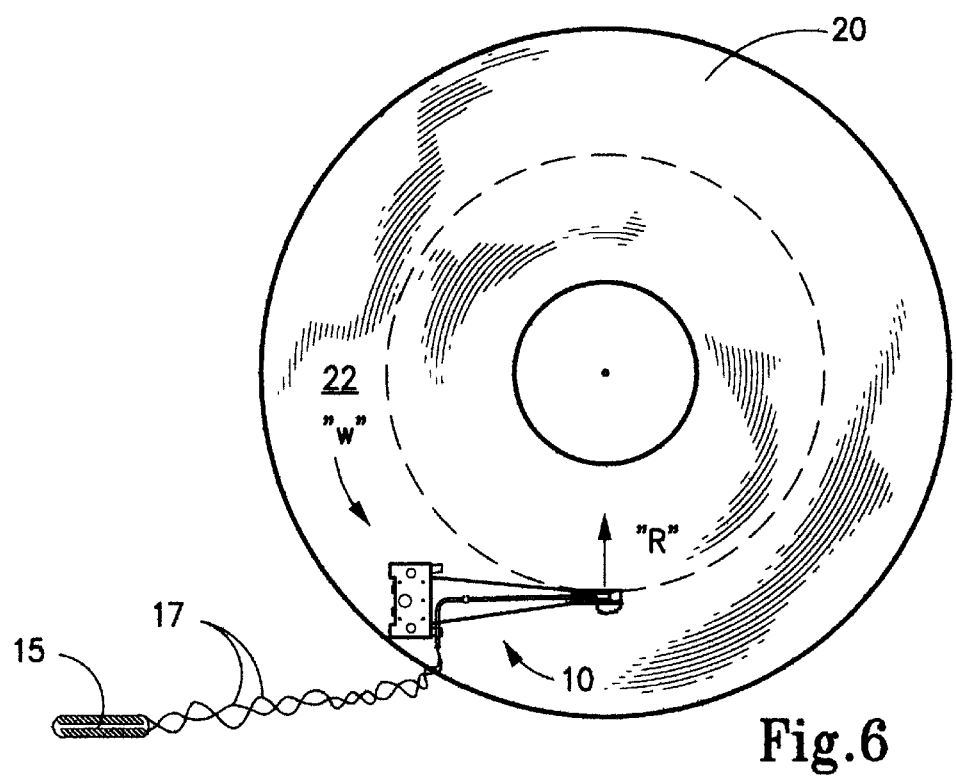
FIG. 6 is a top plan view of the glide head assembly according to the first exemplary embodiment of the present invention and showing the assembly hovering above a surface of a magnetic disk that is rotating counterclockwise at an angular velocity "w"

Throughout the testing procedure, rigid memory disk 20 rotates with varying angular velocity "w" so that upper surface 22 passes beneath glide head structure 50 with a constant linear velocity. As rigid memory disk 20 rotates, upper glide head assembly 10 is moved radially inward in the direction "R" a selected speed so that the entire upper surface area of rigid memory disk 20 passes therebelow. While FIG. 6 shows a desired orientation of upper glide head assembly 10 relative to disk 20, it should be understood that other orientations are certainly contemplated. For example, upper glide head assembly 10 could be moved radially outwardly along disk 20 without jeopardizing response characteristics. In addition, it should be readily appreciated by one of ordinary skill in this field that the angular velocity "w" and the radial speed may also be selectively chosen to meet customer requirements for the integrity of rigid memory disk 20.

As shown in FIG. 7, it is preferred that a leading edge 58 of slider 60 be ramped to provide stability to slider 60 so that glide head structure 50 may fly with a certain pitch, thereby preventing glide head structure 50, and specifically slider 60, from flying too close to upper surface 22 and scoring rigid memory disk 20 during operation. Leading edge 58 hovers approximately $14\mu$ inches above upper surface 22, while a trailing edge 59 hovers approximately $1\mu$ inches above upper surface 22. Of course, actual flying height of the leading and trailing edges 58,59 would necessarily depend on the various test conditions of the system, such as the width of the air bearing surface, disk speeds, ramp angle, etc. It may be readily understood, then, that as an asperity 52, which typically has a height of $0.5-2\mu$ inches, approaches it comes into contact with trailing edge 59. This, in turn, causes slider 60 to pivot about an orientation nub 45 disposed on tongue 44 so that slider 60 is urged upwardly.

This perturbs legs 75 and 76 of transducer 70 and excitation causes a disturbance in the crystalline lattice of piezoelectric transducer 70. This disturbance results in a voltage distribution between its upper and lower surfaces 77, 78. An electronic signal is generated in electrical lead 17, which signal is communicated, via the paddleboard 15 in FIG. 6, back to signal processor 19.

However, it should also be appreciated that a variety of other electronic signals are also generated by virtue of the detection of asperity 52. For example, the disturbance causes a forced vibration within flexure 30 and generates an appreciable amount of noise in the system. These signals dampen fairly rapidly. Each of these various electronic signals, which have different frequency and amplitude characteristics, is communicated to the signal processor 19 where an appropriate bandpass filter may be applied to select the dominant mode. Ideally, it is preferable to tune the frequency of one or both of the legs of the transducer to the natural frequency of the slider so that excitation of the slider at this frequency magnifies the response characteristics of the transducer.

It has been found that by using the specific parameters discussed herein, that is a piezoelectric transducer 70 having a thickness of approximately 25 mls (0.025 inches) and a 34 mls (0.034 inches) slider, this dominant frequency is approximately 450 kHz. Accordingly, a bandpass filter having a range of approximately 200–700 kHz may be employed in signal processor 19 to detect, this dominant frequency. The remaining electronic signals generated by the disturbance are substantially filtered out by the bandpass filter.

Figure 8:
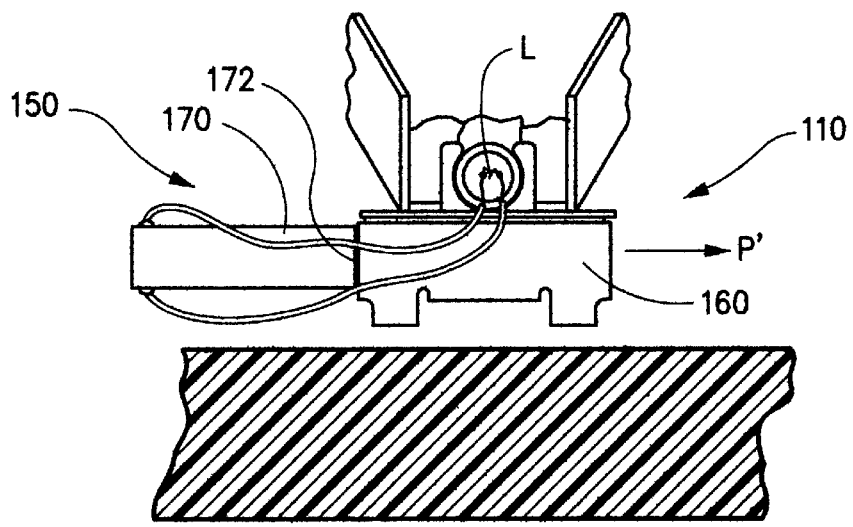
FIG. 8 is an end view in elevation and in partial cross-section, of a glide head assembly according to a second exemplary embodiment of the present invention.

A second exemplary embodiment for the glide head assembly according to the present invention may now be seen with reference to FIG. 8. Here, glide head assembly 110 is constructed similarly to that of glide head assembly 10 discussed above, with the exception that piezoelectric transducer 170 is adhered to a longitudinally extending sidewall face 167 of slider 160 so that transducer axis "P'" is perpendicular to longitudinal axis "L". In all other respects, glide head structure 150 is constructed identically to glide head structure 50 discussed above.

Of course, it should be appreciated that a variety of other configurations for the glide head assembly of the present invention, and specifically its glide head structure, would also be contemplated without departing from the inventive concepts contained herein. For example, while it is preferred that the piezoelectric transducer be generally V-shaped so that it has a leg associated with each of the rails of the slider, it is not necessary that these legs be joined together at a juncture as discussed above. That is, two separate legs could project outwardly from the slider's sidewall surface with pairs of electrical leads associated with each of these legs. Of course, for ease of manufacturing, it is preferred to use the construction described herein so that electrical continuity exists between each of the transducer's legs.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A glide head assembly associated with a mounting structure and adapted for use with a test system for detecting a presence of asperities on a moving surface, wherein the test system includes a signal processor operative to process an electronic signal generated in response to the presence of an asperity, said glide head assembly comprising:
   (a) an elongated flexure having a longitudinal axis and including a first end portion attachable to said mounting structure and a second end portion opposite said first end portion, said second end portion adapted to be positioned in proximity to the moving surface when in an operative state;
   (b) a slider disposed on said second end portion, said slider having a first surface facing the moving surface when in the operative state, a second surface opposite the first surface and a sidewall surface extending therebetween; and
   (c) a piezoelectric transducer secured to said sidewall surface and projecting outwardly therefrom, said piezoelectric transducer elongated along a central transducer axis that is perpendicular to the longitudinal axis and including a proximal end mounted to said sidewall surface and projecting outwardly from said proximal end to terminate at a free distal end, said piezoelectric transducer responsive in the operative state to the presence of the asperity relative to said slider as the asperity moves past said slider to vibrate, thereby to produce the electronic signal at a selected signal frequency.

2. A glide head assembly according to claim 1 wherein the central transducer axis is in a common plane as the longitudinal axis.

3. A glide head assembly according to claim 1 including electrical contacts disposed in proximity to said free distal end, said electrical contacts located so as to connect to electrical leads supported by said flexure.

4. A glide head assembly according to claim 3 wherein one of said electrical contacts is located on a first surface of said piezoelectric transducer and another of said electrical contacts is located on a second surface of said piezoelectric transducer that is opposite the first surface.

5. A glide head assembly according to claim 3 including a sleeve disposed longitudinally along said flexure, said sleeve operative to receive and support said electrical leads.

6. A glide head assembly according to claim 1 wherein said slider is secured to said second end portion by a first layer of first adhesive and wherein said piezoelectric transducer is secured to said sidewall surface by a second layer of second adhesive.

7. A glide head assembly according to claim 6 wherein said second adhesive is selected from a group consisting of ester-based adhesives and ether-based adhesives.

8. A glide head assembly according to claim 1 wherein said piezoelectric transducer has a reduced thickness relative to said slider.

9. A glide head assembly according to claim 8 wherein the thickness of said piezoelectric transducer is within a range of 5 mls (0.005 inches) to 30 mls (0.030 inches), inclusively.

10. A glide head assembly according to claim 9 wherein the thickness of said piezoelectric transducer is 25 mls (0.025 inches).

11. A glide head assembly according to claim 1 wherein said flexure includes a tongue fastened thereto to form the second end portion, said slider being secured to said tongue.

12. A glide head assembly according to claim 1 wherein said piezoelectric transducer includes first and second spaced apart leg portions each projecting away from said slider.

13. A test device for testing opposed moving surfaces of a rotating memory disk to determine a presence of asperities thereon; comprising:
   (a) a mounting structure;
   (b) a rotary drive operative to rotate the memory disk relative to said mounting structure;
   (c) at least a first glide head assembly supported on said mounting structure, said first glide head assembly including:
      (1) a flexure including a first end portion attachable to said mounting structure and a second end portion opposite said first end portion, said second end portion adapted to be positioned in proximity to one of the moving surfaces when in an operative state;
      (2) a slider disposed on said second end portion, said slider having a first surface facing the moving surface when in the operative state, a second surface opposite the first surface and a sidewall surface extending therebetween; and
      (3) a piezoelectric transducer mountably supported on a face of said sidewall surface that extends transversely to the longitudinal axis and including a proximal end mounted to said face and a pair of legs which diverge longitudinally from said proximal end to terminate, respectively, at first and second free distal ends, said piezoelectric transducer responsive in the operative state to the presence of the asperity relative to said slider as the asperity moves past said slider to vibrate, thereby to produce an electronic signal at a selected signal frequency;
   (d) a signal processor operative to process the electronic signal; and
   (e) electrical interconnects establishing electrical communication between said piezoelectric transducer and said signal processor.

14. A test device according to claim 13 wherein said piezoelectric transducer is elongated along a central transducer axis, said legs symmetrical about the central transducer axis.

15. A test device according to claim 14 wherein said legs intersect at a juncture of said piezoelectric transducer.

16. A test device according to claim 13 wherein said slider is secured to said second end portion by a first layer of first adhesive and wherein said piezoelectric transducer is secured to said sidewall surface by a second layer of second adhesive.

17. A test device according to claim 13 wherein said flexure includes a tongue fastened thereto to form the second end portion, said slider being secured to said tongue.

18. A glide head assembly associated with a mounting structure and adapted for use with a test system for detecting a presence of asperities on a moving surface, wherein the test system includes a signal processor operative to process an electronic signal generated in response to the presence of an asperity, said glide head assembly comprising:
  (a) an elongated flexure having a longitudinal axis and including a first end portion attachable to said mounting structure and a second end portion opposite the first end portion, said second end portion adapted to be positioned in proximity to the moving surface when in an operative state;
  (b) a slider disposed on said second end portion, said slider having a first surface facing the moving surface when in the operative state, a second surface opposite the first surface and a sidewall surface extending therebetween; and
  (c) a legged piezoelectric transducer having a central transducer axis and disposed on said slider, said piezoelectric transducer including a proximal end mountably supported by said slider and including a pair of legs extending from said slider to terminate, respectively, at first and second free distal ends, each of said legs responsive in the operative state to the presence of the asperity relative to said slider as the asperity moves past said slider to vibrate, thereby to produce the electronic signal at a selected signal frequency.

19. A glide head assembly according to claim 18 wherein said legs diverge longitudinally toward said first and second free distal ends.

20. A glide head assembly according to claim 19 wherein each of said legs is skewed relative to the central transducer axis.

21. A glide head assembly according to claim 20 wherein said legs are symmetrical about the central transducer axis.

22. A glide head assembly according to claim 21 wherein said legs intersect at a juncture that is supported on said slider.

23. A glide head assembly according to claim 18 wherein said legs intersect at a juncture that is supported on said slider.

24. A glide head assembly according to claim 18 wherein said legged piezoelectric transducer is adhered to said slider.

* * * * *